United States Patent [19]

Stanchak et al.

[11] Patent Number: 6,005,200

[45] Date of Patent: *Dec. 21, 1999

[54] COMPENSATION OF STYLUS SIGNALS IN DIGITIZING TABLET

[75] Inventors: Carl M. Stanchak; John S. Keck; Kevin J. Bruno; William K. Petty, all of Colorado Springs, Colo.

[73] Assignees: Hyundai Electronics America, San Jose, Calif.; NCR Corporation, Dayton, Ohio

[*] Notice: This patent is subject to a terminal disclaimer.

[21] Appl. No.: 08/286,720

[22] Filed: Aug. 5, 1994

[51] Int. Cl.$^6$ .................................................. G08C 21/00
[52] U.S. Cl. .................................. 178/19.01; 178/18.01; 178/18.02; 178/19.03
[58] Field of Search .................................. 178/18, 19, 20, 178/18.01, 18.02, 19.01, 19.03; 345/156, 179, 180, 173, 174, 175, 176, 177; 455/63, 66, 226.1, 310, 296; 381/94

[56] References Cited

U.S. PATENT DOCUMENTS

| | | | |
|---|---|---|---|
| 4,210,775 | 7/1980 | Rodgers | 178/19 |
| 4,575,581 | 3/1986 | Langberg | 178/18 |
| 4,650,926 | 3/1987 | Nakamura et al. | 178/18 |
| 4,672,154 | 6/1987 | Rodgers | 178/19 |
| 4,831,566 | 5/1989 | Matthews et al. | 364/571.05 |
| 4,853,493 | 8/1989 | Schlosser et al. | 178/18 |
| 4,991,148 | 2/1991 | Gilchrist | 178/18 |
| 5,051,736 | 9/1991 | Bennett | 179/19 |
| 5,115,107 | 5/1992 | Crooks et al. | 178/18 |
| 5,136,125 | 8/1992 | Russell | 178/19 |
| 5,138,118 | 8/1992 | Russell | 178/19 |
| 5,218,174 | 6/1993 | Gray | 178/18 |
| 5,223,677 | 6/1993 | Kapp | 178/18 |
| 5,225,636 | 7/1993 | Protheroe | 178/18 |
| 5,227,590 | 7/1993 | Protheroe | 178/18 |
| 5,227,622 | 7/1993 | Suzuki | 345/180 |
| 5,239,489 | 8/1993 | Russell | 178/18 |
| 5,241,303 | 8/1993 | Register | 178/19 |
| 5,245,139 | 9/1993 | Protheroe et al. | 178/18 |
| 5,247,137 | 9/1993 | Epperson | 178/18 |
| 5,294,792 | 3/1994 | Lewis | 345/180 |
| 5,373,117 | 12/1994 | Crooks | 178/18 |
| 5,412,161 | 5/1995 | Crooks | 178/18 |

OTHER PUBLICATIONS

"Suppression of Noise in Speech)" IEEE Transactions on Speech, vol. ASSP.27, No. 2, Apr. 1979; p. 113–120.

*Primary Examiner*—Vijay Shankar
*Attorney, Agent, or Firm*—Townsend and Townsend and Crew

[57] ABSTRACT

The invention concerns digitizing tablets in portable computers, wherein position of a stylus, located on the tablet, is computed. The invention corrects for various errors which creep into the computation, in order to produce a more accurate stylus position. The digitizing tablet has multiple sensors used to determine the stylus' position with respect to the digitizing tablet. Error signals are generated by measuring the sensors outputs when the stylus is not inducing a signal into the digitizing tablet. In one embodiment, these error signals are used to modify certain parameters used in calculating the stylus position.

9 Claims, 8 Drawing Sheets

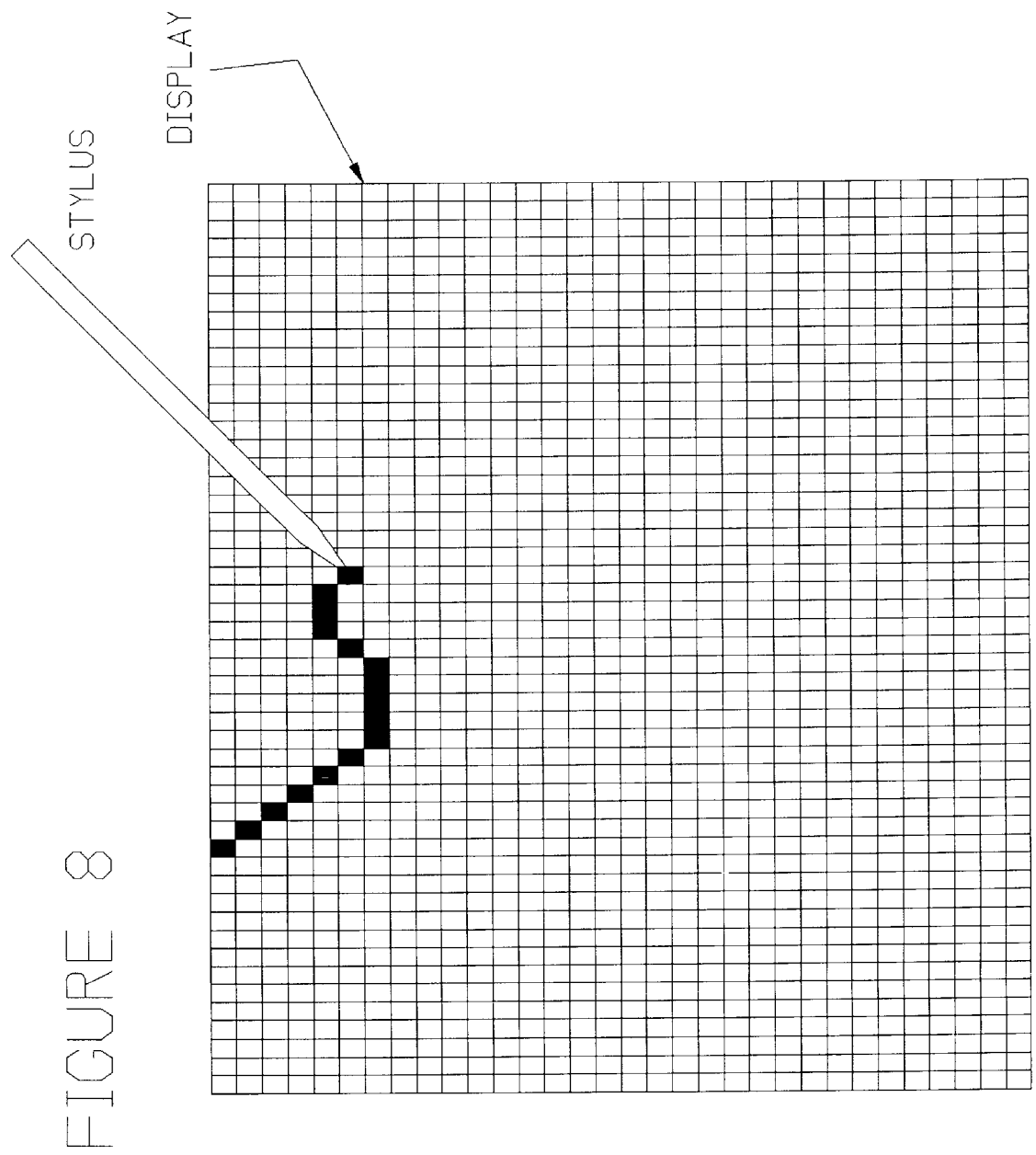

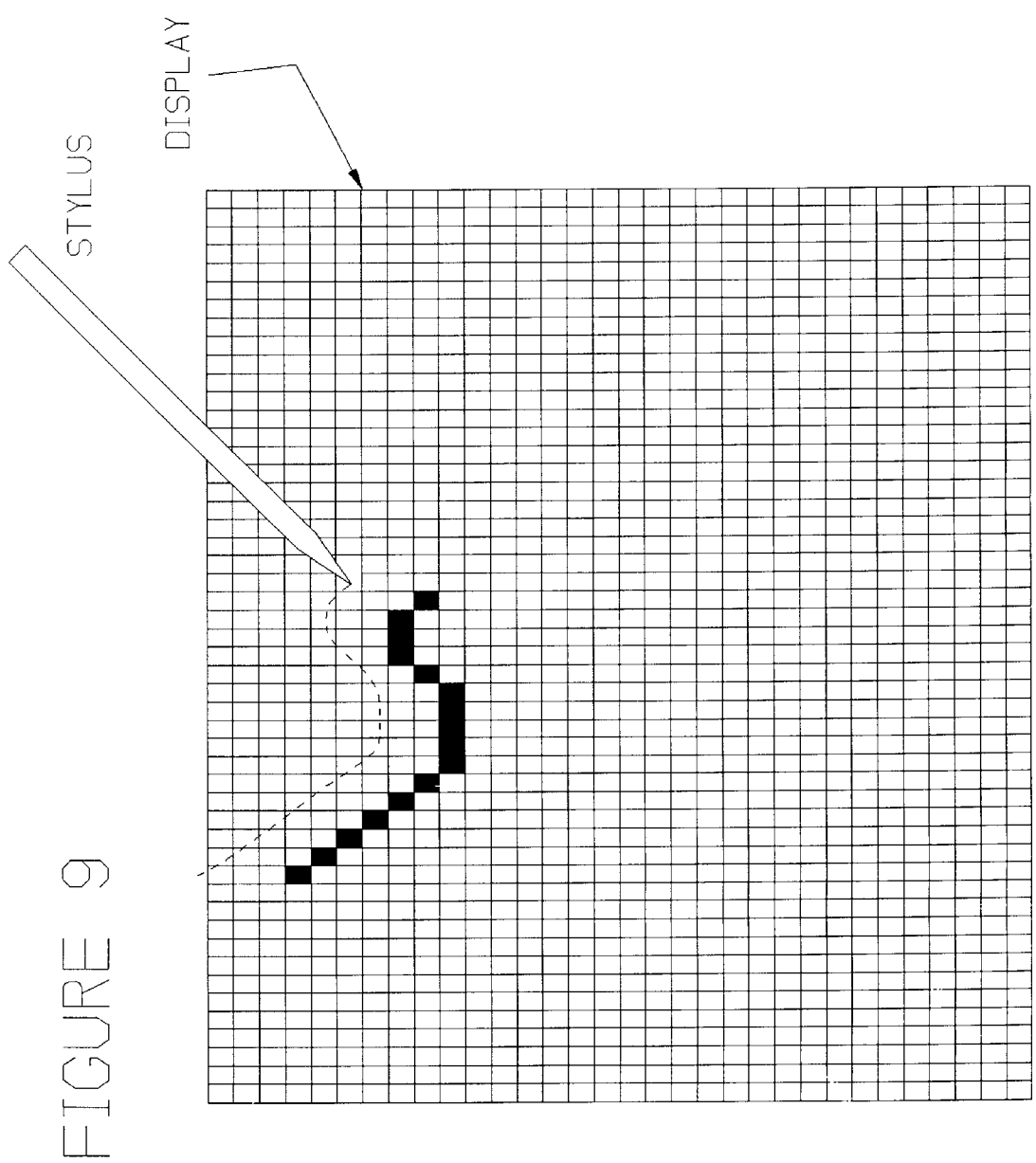

COMPENSATION OF STYLUS SIGNALS IN DIGITIZING TABLET

In digitizing tablets, unavoidable background signals are present. The invention reduces the influence of these signals.

BACKGROUND OF THE INVENTION

FIG. 1 is a highly simplified view of a digitizing tablet 3 and its associated stylus 6. There are four current-to-voltage amplifiers (labeled I-to-V), one at each corner. The stylus 6, when activated, produces a signal 9, as indicated in FIG. 2. This signal induces currents I1–I4, which are detected by the I-to-V amplifiers.

The I-to-V amplifiers each produce a voltage (V) indicative of the size its respective current (I). Processing circuitry, not shown but known in the art, receives the voltage signals, and computes the position of the stylus signal 6.

The currents I1–I4 are induced because the stylus 6 acts as one plate of a capacitor. The digitizing tablet (which bears a resistive surface of a material such as indium tin oxide) acts as the other plate. As FIG. 3 indicates, when negative charge is applied to the tip 2 of the stylus 6, a positive charge is induced on the surface of the tablet 6. Currents I1–I4 supply this positive charge.

Conversely, as in FIG. 4, a positive charge on the tip 2 of the stylus 6 induces a negative charge on the tablet. The currents I1–I4 supply this negative charge.

As FIG. 5 shows, each current can be viewed as following a direct path from the stylus to one corner of the tablet. The resistance of each path depends on the length of the path. The size of the current depends on the resistance. Thus, knowledge of the current allows one to infer the path length. A highly simplified example will illustrate.

Assume that the stylus in FIG. 5 represents a voltage source applied to the tablet. Four currents will be generated, each indicated by a dashed arrow running to a corner. The paths have the relative lengths shown in FIG. 5, and also listed the following Table.

TABLE

| PATH | RELATIVE LENGTH | RELATIVE RESISTANCE | RELATIVE CURRENT | RELATIVE I-to-V VOLTAGE |
| --- | --- | --- | --- | --- |
| AA | 0.66 | 0.66 | 1.52 | 1.52 |
| BB | 1.00 | 1.00 | 1.00 | 1.00 |
| CC | 0.93 | 0.93 | 1.08 | 1.08 |
| DD | 0.55 | 0.55 | 1.82 | 1.82 |

The resistance of the path depends on the length, so that the relative resistances are in proportion to the relative path lengths, as indicated in the Table.

Current equals voltage divided by resistance, V/R, so that the relative currents will be inversely proportional to the relative path lengths, as indicated in the Table.

The I-to-V amplifiers in FIG. 1 each produce a voltage which is proportional to its respective current. Thus, the outputs of the I-to-V amplifiers have the relative magnitudes indicated in the Table. The output signals can be used to compute position of the stylus, as stated above.

Noise

The I-to-V amplifiers produce other, unwanted, signals, in addition to those generated by the stylus. For example, nearby cathode ray tubes, fluorescent lights, and electric motors induce charge on the digitizing pad.

In addition, modern electronic amplifiers are excellent, but not perfect. When the inputs of a hypothetical perfect amplifier receive no signal, the perfect amplifier produces an output signal of zero. However, an actual, physical, amplifier generally produces a small signal under the same circumstances, called an offset signal. The offset signal is another type of unwanted signal.

These unwanted signals interfere with computation of stylus position. When stylus position is computed incorrectly, a line drawn by a computer can be displaced from the actual path of the stylus. FIG. 9 gives an example: the line indicated by the shaded pixels is displaced from the actual path of the stylus, which is indicated by the dashed line.

Moreover, greater interference occurs when the stylus is self-powered. A self-powered stylus generally receives power from self-contained batteries, as opposed to receiving power from a digitizing tablet (or from an associated computer), through a tether. The self-powered stylus produces a smaller signal than a tethered stylus, because a tethered stylus has access to a larger power supply, through its tether.

Prior Art Approach

One existing approach to compensating for the unwanted signals is the following. (The four I-to-V amplifiers are multiplexed through a common channel, as indicated in FIG. 6.)

STEP 1. Electrically disconnect the I-to-V amplifiers from the tablet. (That is, break lines L in FIG. 6.) This disconnection is generally done either when the stylus is absent from the tablet, or at periodic time intervals.

STEP 2. Measure the output of the common channel. If an offset exists in the channel, it will be detected at this time.

STEP 3. Generate a compensation signal equal to the measured offset. The offset signal is generally found to be positive, so that the compensation signal will be negative. However, of course, there is no requirement that the offset signal be positive.

STEP 4. Re-connect the I-to-V amplifiers to the tablet.

STEP 5. Detect the position signals produced by the I-to-V amplifiers, in the usual manner.

STEP 6. Subtract the compensation signal, generated in step 3, from each position signal. As stated above, the position signals are multiplexed through a single channel. Thus, this subtraction will be taken from the output signal of this single channel.

STEP 7. Use the four position signals, but as corrected in step 6, in the following calculations. Variables in the calculations are indicated in FIG. 6.

$$x=(A+B-C-D)/(A+B+C+D)$$

$$y=(A+C-B-D)/(A+B+C+D)$$

STEP 8. Correct x and y, produced in step 7, based on a two-dimensional look-up table. The table contains a pair of entries (not necessarily unique) for each possible pair of (x and y) computed in step 7. The (x,y) pair computed in step 7 is adjusted by the entry pair in the table.

The look-up table corrects for imperfections in the digitizing pad, and other irregularities. The table is generated in a known manner, such as physically measuring the actual position of the stylus for each (x,y) pair produced in step 7, and recording in the table any error betwen the actual position and the position computed in step 7. In addition, other correction factors can be included in the table.

The invention improves upon this position computation.

OBJECT OF THE INVENTION

An object of the invention is to provide an improved system for ascertaining position of a stylus on a digitizing tablet.

SUMMARY OF THE INVENTION

The present invention is directed to a method and apparatus for improving the detection of the position of a stylus with respect to a digitizing tablet. In one form of the invention, signals from multiple detectors on a digtiizing tablet are received. The signals are corrected, if necessary, by error signals produced by each detector. These error signals are generated by measuring the sensors' outputs when the stylus is not inducing a signal into the digitizing tablet. In one embodiment, these error signals are used to modify certain parameters used in calculating the stylus position.

BRIEF DESCRIPTION OF THE DRAWINGS

FIG. 8 illustrates a correctly drawn line, which follows the stylus.

FIG. 9 illustrates an incorrectly drawn line, which does not follow the stylus.

DETAILED DESCRIPTION OF THE INVENTION

The invention enhances the procedure described in the Background. The invention indertakes the following steps, in addition to those outlined in the Background.

STEP A. The invention detects four "stylus-absent signals," ABS_A, is ABS_B, ABS_C, and ABS_D. The time of these readings, relative to steps 1–8 of the Background, is not important.

Figure 6:
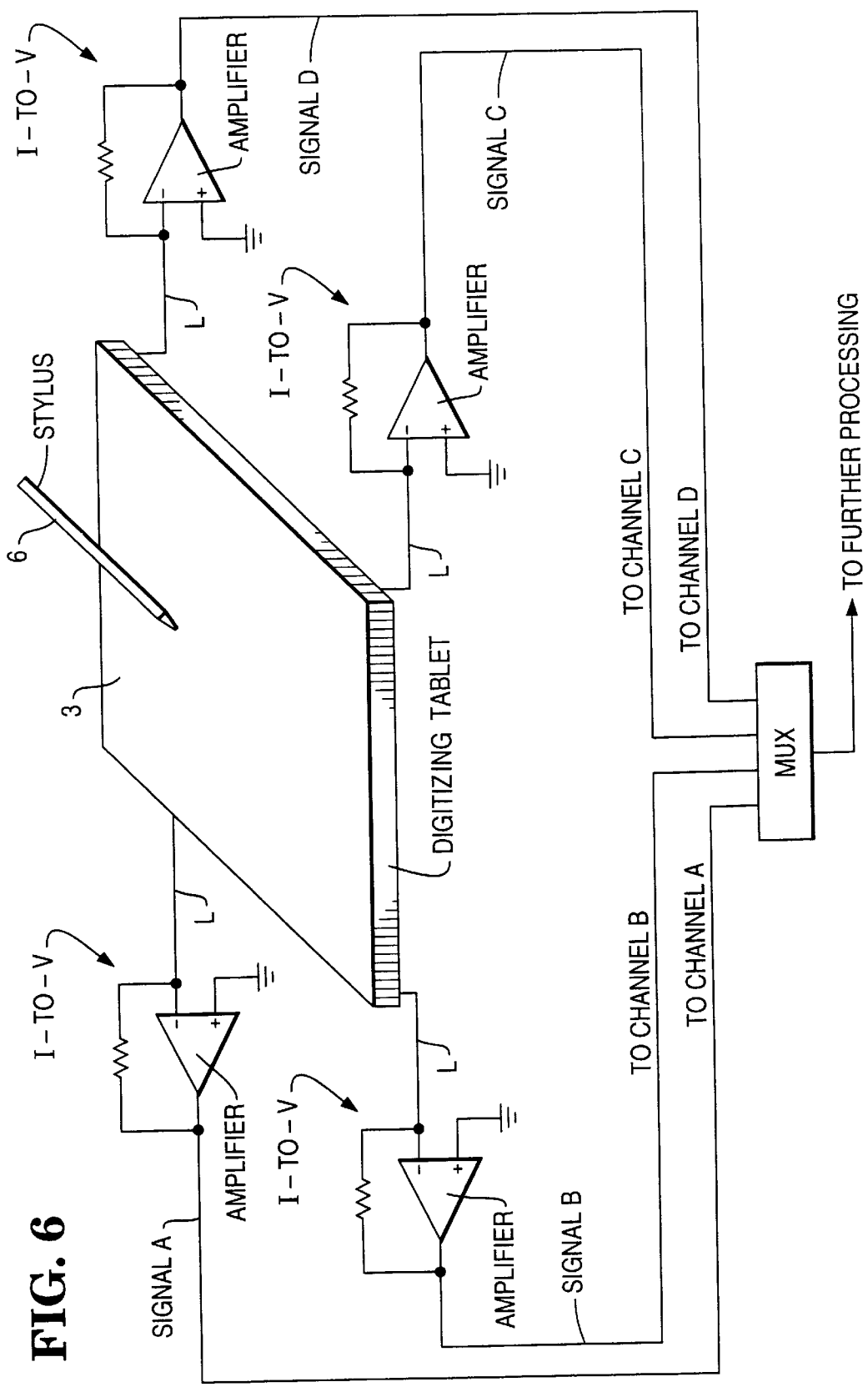
FIG. 6 illustrates a multiplexer MUX which multiplexes signals A, B, C, and D.

Each stylus-absent signal is read from the multiplexer MUX in FIG. 6, but when the stylus is absent from the tablet. Since the signal is read when the stylus is absent from the tablet, this signal is hereby defined as a stylus-absent signal. (It is known in the art how to detect whether the stylus is present or absent.)

Ideally, all four signals should be zero, but, in general, they are not. In later steps, they are added (or subtracted) to (or from) "stylus-present signals."

STEP B. The invention corrects each stylus-absent signal, measured in Step A, by the compensation signal described in step 3 of the Background. The resulting four Corrected Stylus-Absent Signals are designated

COR_ABS_A,

COR_ABS_B,

COR_ABS_C, and

COR_ABS_D.

STEP C. The invention corrects the denominators (both of which are identical) of step 7 of the Background by the algebraic sum of the four Corrected Stylus-Absent Signals, produced in Step B. In general, these signals are found to be positive, so that, in the correction, they are subtracted from the denominators. Thus, as one example, the corrected denominator D is the following:

D(corrected)=(A+B+C+D)−(COR_ABS_A+COR_ABS_B+COR_ABS_C+COR_ABS_D)

However, of course, the Corrected Stylus-Absent Signals may be negative, or a combination of positive and negative. Correction to the denominator involves adding the negative of the algebraic sum of the COR_ABS_X signals, wherein "X" refers to A, B. C, or D, as appropriate.

STEP D. The invention corrects the numerators of step 7 of the Background, but in a different manner than the denominators (which are corrected in Step C). Each numerator is the SUM of a pair of DIFFERENCES. That is, in the x-computation, the sum of the pair of differences is (A−C)+(B−D) or  Computation (1)

(A−D)+(B−C).  Computation (2)

In the y-computation, the sum of pairs is (A−D)+(C−B) or  Computation (3)

(A−B)+(C−D).  Computation (4)

In contrast, each denominator (corrected in Step C) is a PURE SUM. A very simple example will illustrate the difference.

EXAMPLE

Each I-to-V can be assumed to produce its own error signal, namely, ERROR_A, ERROR_B, ERROR_C, and ERROR_D (ERROR_A, ERROR_B, ERROR_C and ERROR_D are equivalent in meaning to ABS_A, ABS_B, ABS_C and ABS_D, respectively, as described in STEP A). That is, the signals read when the stylus is present, including the signals read in step A are the following. (The channel offset signal is ignored in this example.)

SIGNAL_A+ERROR_A,

SIGNAL_B+ERROR_B,

SIGNAL_C+ERROR_C,

SIGNAL_D+ERROR_D.

When the signals are summed, as in the denominators, the ERRORs are also summed. Subtracting the algebraic sum of the ERRORs removes the summed ERRORs.

However, in the numerators, the situation is different. Considering Computation (1), above, the sum is

[(SIGNAL_A+ERROR_A)−(SIGNAL_C+ERROR_C)]+[(SIGNAL_B+ERROR_B)−(SIGNAL_D+ERROR_D)].

The internal sum of ERROR signals, within this sum, is

INTERNAL ERROR SUM: ERROR_A−ERROR_C+ERROR_B−ERROR_D.

Subtracting the algebraic sum of the ERRORs will not cancel the errors. For example, if every ERROR equals 0.1, then the INTERNAL ERROR SUM is zero. Subtracting the algebraic sum of the ERRORs, which is 0.4, gives a result of −0.4, which is clearly erroneous.

The invention handles the numerators in the following way. The invention compares the ERRORs with each other. (This is a simple computation step, known in the art.) If the ERRORs are identical, then the invention does nothing, because the normal computation of the numerators cancels the ERRORs: ERROR_C cancels ERROR_A, and ERROR_D cancels ERROR_B.

On the other hand, if the ERRORs are not identical, a correction of the numerator is undertaken. For example, assume that all ERRORs are identical at 0.1, except for ERROR_D, which is 0.11. The deviation of ERROR_D is 0.01. This deviation is subtracted from ERROR_D, making ERROR_D equal to the others.

Important Considerations

1. A system using a battery-powered stylus is under consideration. Some portable computers, which are battery powered, have styli which are attached to the computers by tethers, and which receive power from the battery-powered computer. Thus, it could be said that these styli are "battery-powered."

However, in the present context, a "battery-powered stylus" refers to one which contains its own power supply, such as batteries.

Figure 7:
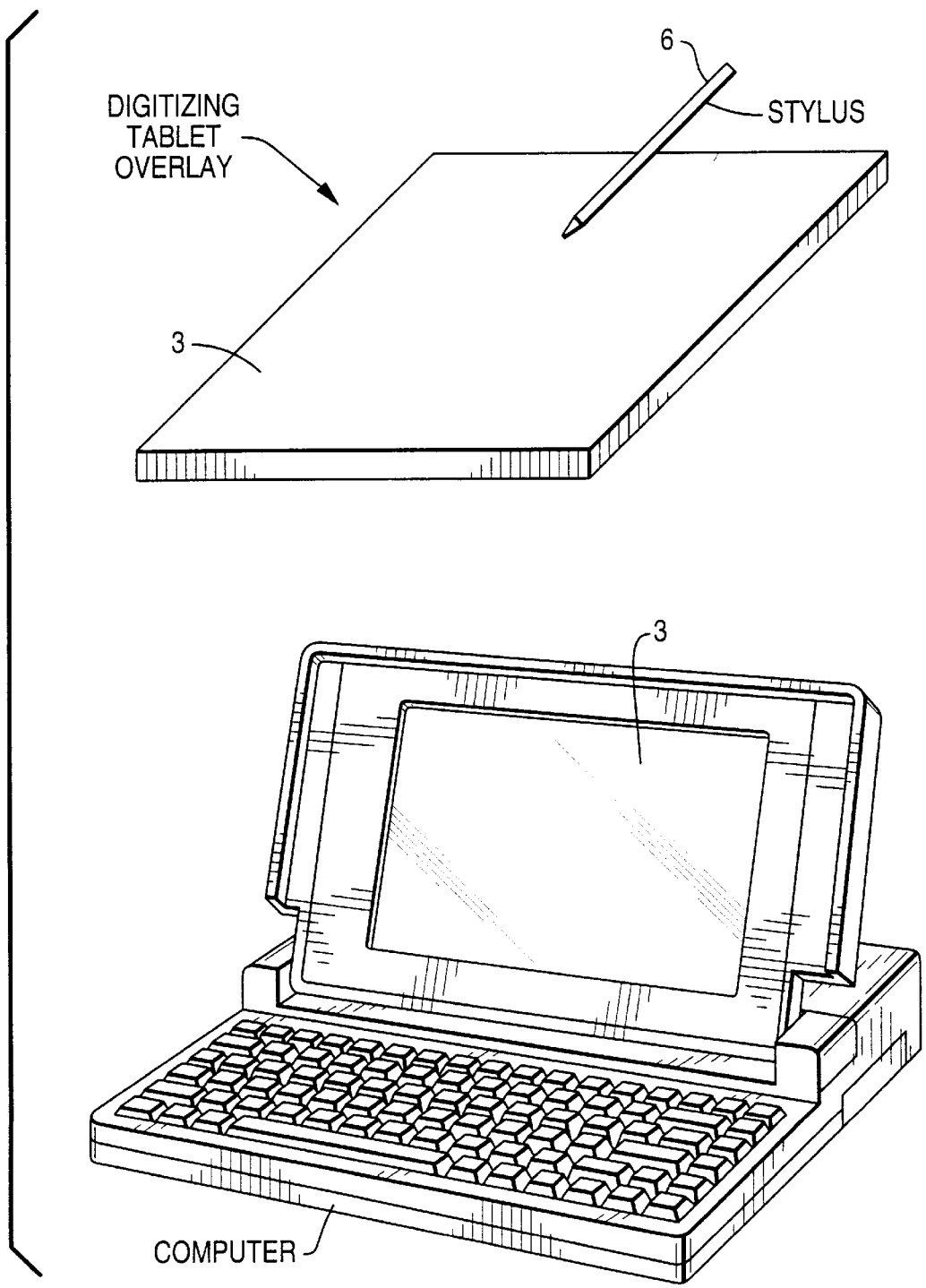
FIG. 7 illustrates a transparent digitizing tablet 3 overlaid upon the display of a portable computer.

2. Portable computers having digitizing tablets overlaid upon their displays, as shown in FIG. 7, and which detect position of a stylus, are frequently called "pen-based computers." Of course, the "pen" is not an actual ink-bearing pen, the "pen" is the stylus.

Such computers frequently contain software, or firmware, which recognizes handwriting. That is, as a person moves the stylus along the digitizing tablet, the invention, as discussed above, computes data indicating the successive positions of the stylus, and makes the data available to the handwriting-recognition software.

Handwriting-recognition software is commercially available. One such software is sold under the name Penpoint, available from Go Corporation, located in California, USA.

Figure 1:
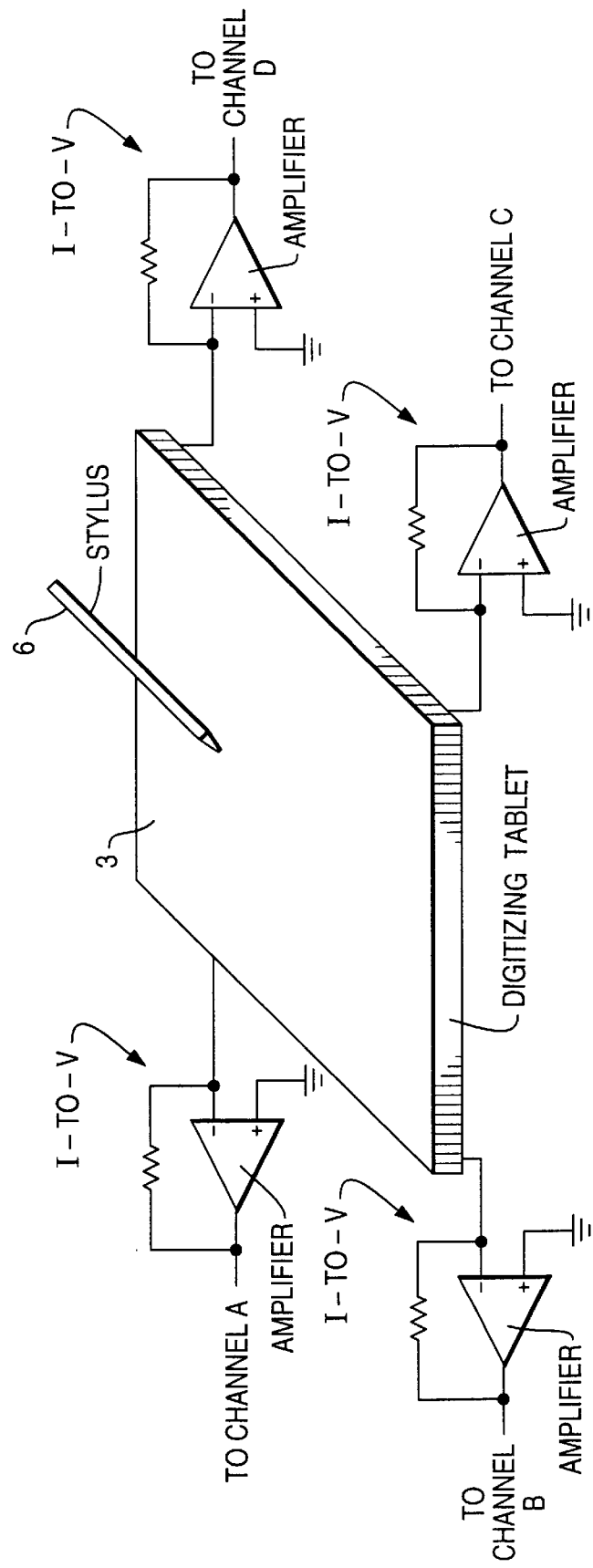
FIG. 1 illustrates a digitizing tablet, with its associated stylus.
Figure 2:
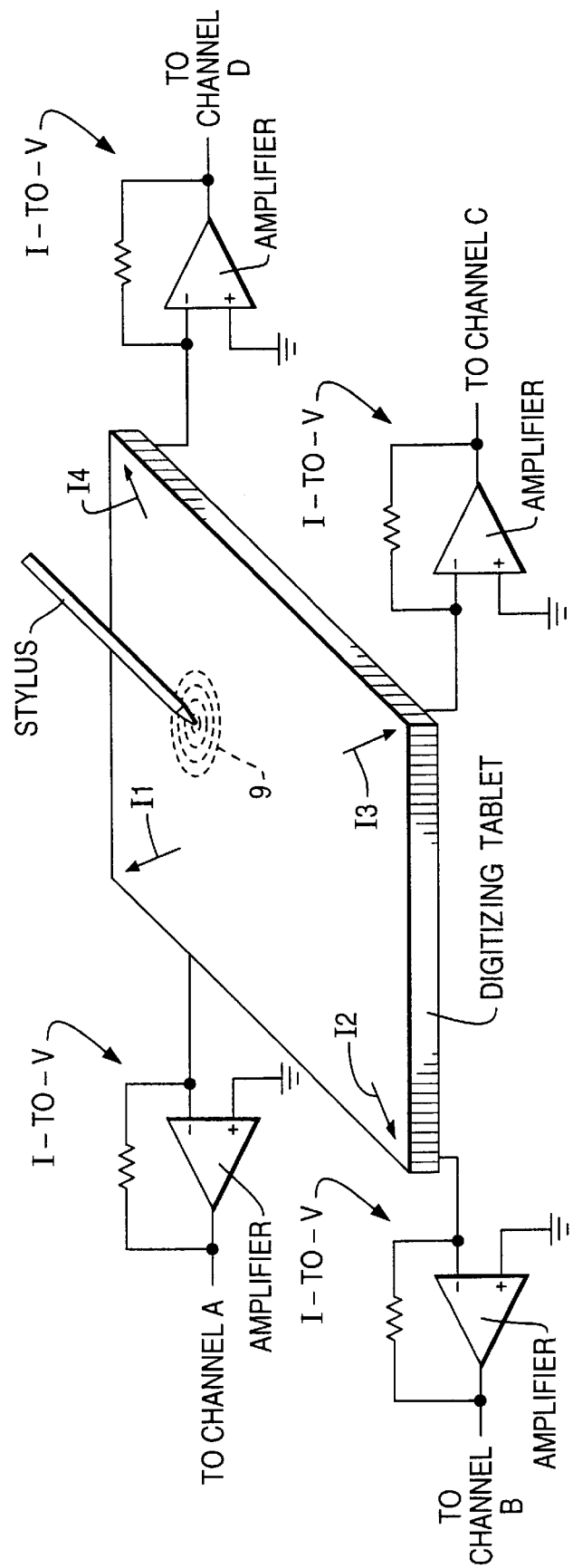
FIG. 2 illustrates a signal 9 produced by the stylus.
Figure 3:
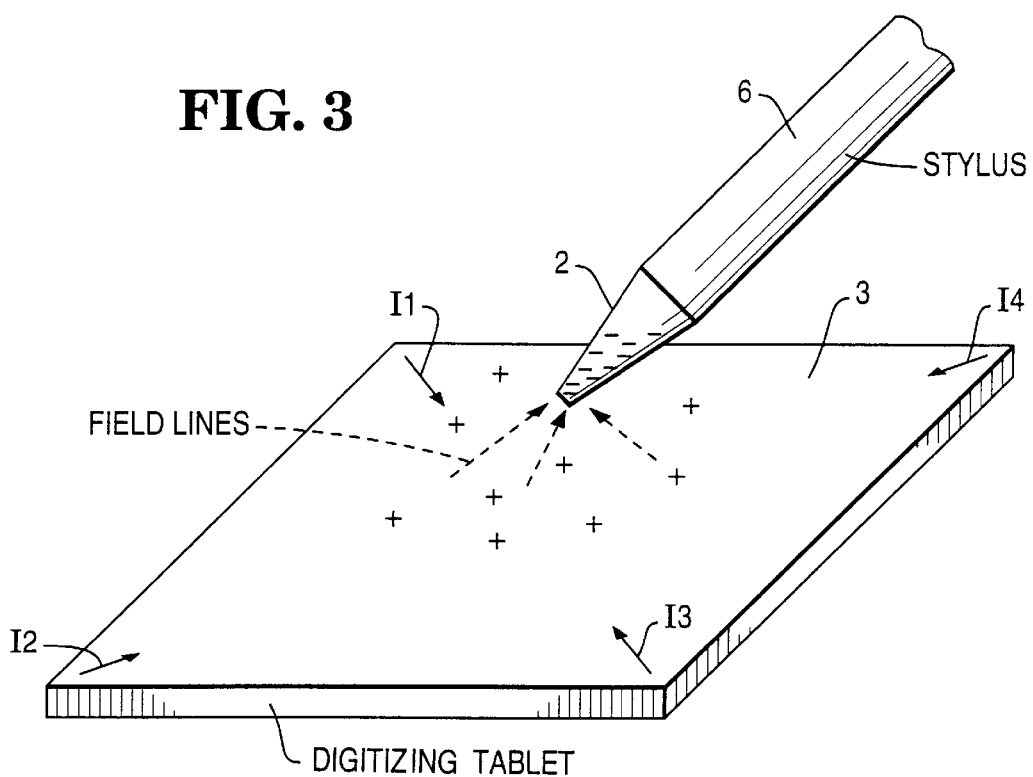
FIGS. 3 and 4 illustrate charge induced on the tablet by a charge carried by the stylus 6.
Figure 4:
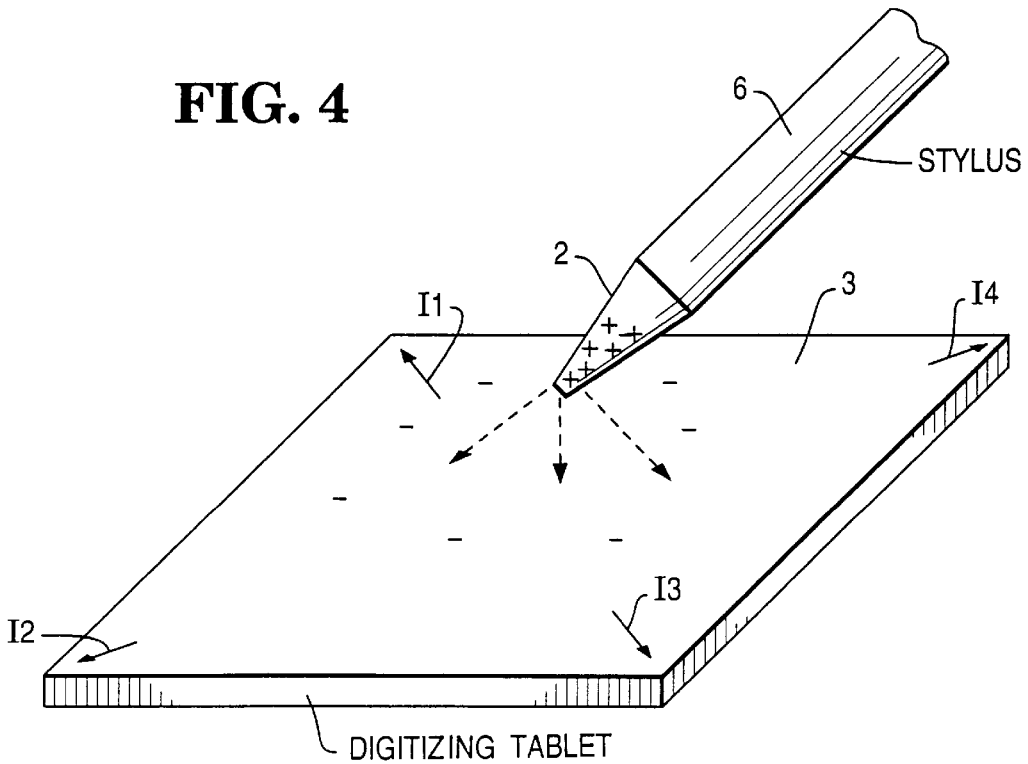
Figure 5:
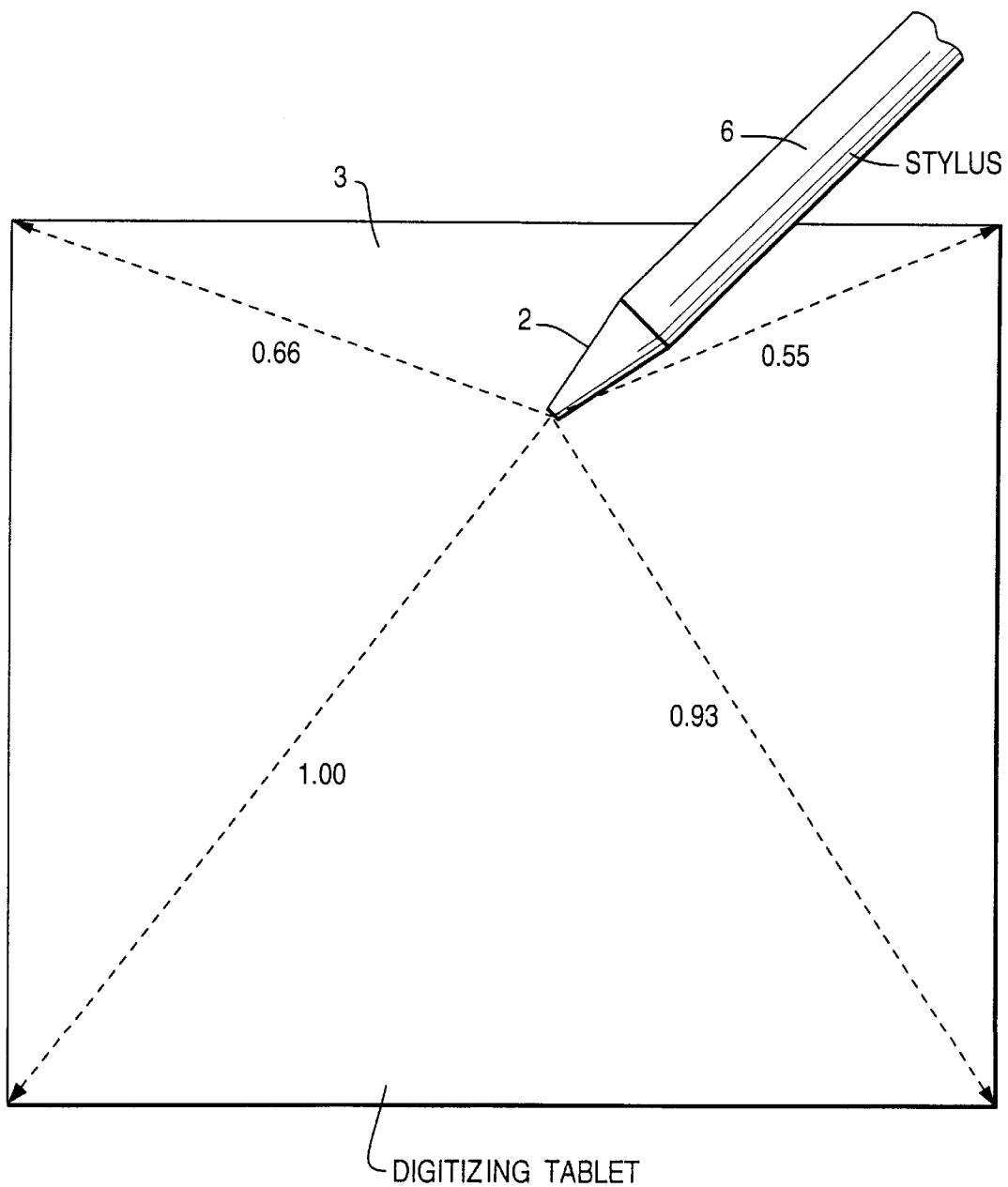
FIG. 5 illustrates current paths from the stylus 6 to corners of the tablet 3.

3. Commercially available digitizing tablets contain sensing systems which detect stylus position. These sensing systems may contain the I-to-V amplifiers as illustrated in FIG. 1.

One feature of the invention is the correction of the stylus-absent signals, or offset signals, produced by the sensing systems.

4. One form of the invention has successfully attained a resolution of 7 bits, using a battery-powered stylus. 7-bit resolution refers to dividing the x- and y-coordinate axes into 128 divisions each. (128 equals 2 raised to the seventh power.)

Thus, for example, if a digitizing tablet were 12.8×12.8 inches, 7-bit resolution corresponds to 0.1 inch divisions on the axes (128 divisions×0.1 inch each=12.8 inches total). This means that the invention can distinguish stylus motion in 0.1 inch increments.

5. It is important, in pen-based computers, to accurately know stylus position, so that the computer can darken the pixel directly beneath the point of the stylus. It is important to darken the proper pixels, in order to use the computer to simulate a line drawn on paper.

For example, FIG. 8 shows a stylus being dragged across a display. The proper pixels have been darkened.

In contrast, FIG. 9 illustrates the same situation. The stylus is dragged along the dashed path, but the wrong pixels have been darkened, due to faulty computation of stylus position. The line does not contact the point of the stylus, and such a line is distracting to the reader.

For the hypothetical 12.8×12.8 tablet described above, pixel position is known within 0.1 inch, and thus the line drawn (formed by darkened pixels) will lie within 0.1 inch of the stylus point. A common display for a portable computer is this size, or smaller.

For a tablet one-half this size (6.4×6.4), the line drawn will lie within 0.05 inch of the stylus point, given 7-bit resolution.

Numerous substitutions and modifications can be undertaken without departing from the true spirit and scope of the invention. What is desired to be secured by Letters Patent is the Invention as defined in the following claims.

We claim:

1. A method for reducing errors when computing position of a stylus on a tablet, wherein the tablet has multiple sensors in which signals are induced by the stylus, comprising the following steps:

when the stylus is not inducing the signals, measuring noise signals for a plurality of the sensors; and using the noise signals when computing position of the stylus on the tablet.

2. The method of claim 1, further comprising the steps of:

measuring a stylus-present signal; and using said stylus-present signal when computing position of the stylus on the tablet.

3. The method of claim 2, further comprising the step of modifying the measured stylus-present signal based upon the noise signals.

4. In a digitizing tablet, wherein x- and y-coordinates of a stylus are computed according to equations:

$$x=(C1+C2-C3-C4)/(C1+C2+C3+C4)$$

$$y=(C1+C3-C2-C4)/(C1+C2+C3+C4),$$

wherein C1, C2, C3, and C4 are coordinate signals produced by sensors in the tablet, a method comprising:

when the stylus is not producina the coordinate signals, measuring noise signals for a plurality of the sensors; and correcting the denominators in the x and y equations with the sum of the noise signals.

5. The method according to claim 4 and further comprising the step of correcting the numerators in the x and y equations, based on the noise signals, if the noise signals are different.

6. A pen-based computer having a display, comprising:

a battery-powered pen, which produces a signal;

a digitizing tablet, overlaid upon the display, which detects the signal, produces data indicative of pen position when the signal is operatively coupled to the tablet, produces errors when the signal is decoupled from the tablet, and corrects offset errors using said errors; and handwriting-recognition software stored within the computer, which processes the data correction means for correcting offset errors produced.

7. In combination:

a portable computer having a digitizing tablet associated with a display;

a battery-powered stylus for producing an electrical signal to be received by the digitizing tablet; and means for measuring noise signals for a plurality of sensors when the digitizing tablet is not receiving the electrical signal, and using the noise signals during stylus location computation.

8. In a portable computer having a digitizing tablet associated with a display, the improvement comprising:

a battery-powered stylus for producing an electrical signal to be received by the digitizing tablet; and means for producing data indicative of pen position when the signal is operatively coupled to the tablet, producing errors when the signal is decoupled from the tablet, and correcting offset errors using said errors.

9. A pen-based computer, comprising:

a pen which produces a signal; and an apparatus which detects the signal, produces data indicative of pen position when the signal is coupled to the apparatus, produces errors when the signal is decoupled from the apparatus, and corrects offset errors using said errors.

* * * * *